United States Patent

[11] 3,602,318

[72] Inventor Erich Slany
 Esslingen/N. -Zell, Germany
[21] Appl. No. 849,031
[22] Filed Aug. 11, 1969
[45] Patented Aug. 31, 1971
[73] Assignee Robert Bosch GmbH
[32] Priority Aug. 22, 1968
[33] Germany
[31] G 67 53 525.5

[54] HAND POWER TOOL
 10 Claims, 6 Drawing Figs.
[52] U.S. Cl. .................................................. 173/170, 77/2
[51] Int. Cl. ............................................... B23b 45/00
[50] Field of Search ...................................... 173/170, 168, 169; 30/272–277, 210; 77/2, 3, 4, 7

[56] References Cited
 UNITED STATES PATENTS

| | | | |
|---|---|---|---|
| 1,410,010 | 3/1922 | Goldschmidt .............. | 173/170 |
| 2,053,720 | 9/1936 | Huck ........................... | 173/170 |
| 2,422,005 | 6/1947 | Frank .......................... | 30/272 |
| 2,807,732 | 9/1957 | Kurtovich .................... | 173/170 |
| 3,316,636 | 5/1967 | Raper, Jr. et al ............. | 30/272 |
| 3,468,384 | 9/1969 | Bodine ........................ | 30/272 |

*Primary Examiner*—James A. Leppink
*Attorney*—Michael S. Striker

ABSTRACT: A hand-operated power tool comprising an elongated housing, a motor arranged therein, a tool at the front end of the housing and adapted to be driven by the motor, and a handgrip spaced rearwardly from the tool. A hand-protector guard is spaced from and extends parallel with the housing, with the front end of the guard secured to the housing forwards of the handgrip and with the rear end of the guard secured to the rear end of the handgrip.

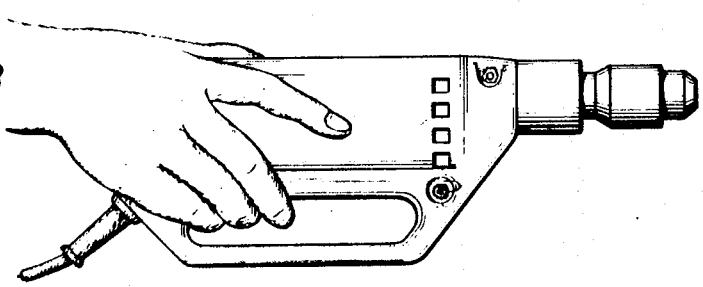
FIG. 3
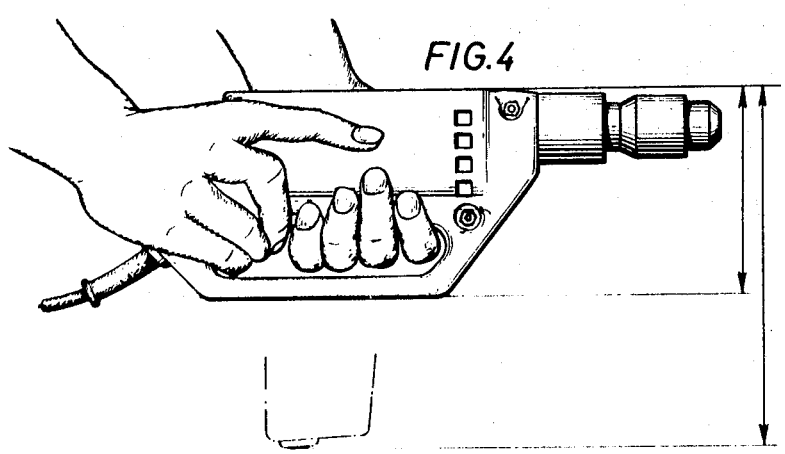
FIG. 4
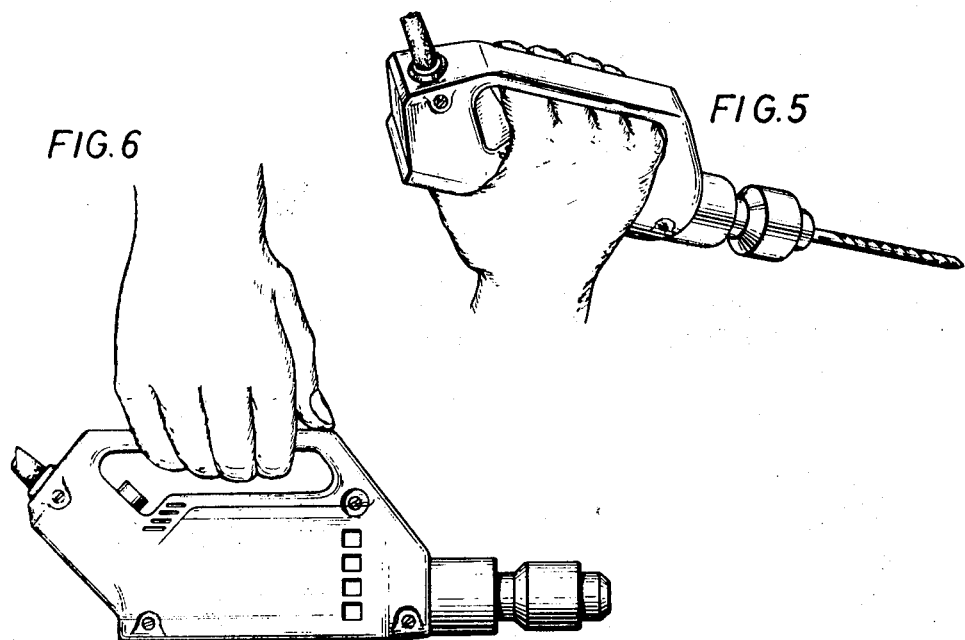
FIG. 5
FIG. 6
INVENTOR:
Erich SLANY
By
his ATTORNEY

HAND POWER TOOL

BACKGROUND OF THE INVENTION

The present invention relates in general to a power tool and more in particular relates to a hand-operated power tool comprising a built-in motor and a tool driven by the motor.

Electrically and air driven power tools, in particular those with a low or moderate output which are used for such applications as drilling, grinding, polishing, and the like, usually come in the form of hand tools, i.e., these type tools have a substantially cylindrical, elongated housing which comprises the motor but at the same time serves as handle of the tool.

In addition, and as regards high-powered tools, likewise electrically or air-operated, experiments have shown it to be advantageous to provide these type tools with an individual handgrip which usually is straight or pistol-shaped and is arranged either adjacent or at the opposite end of the chuck or spindle, or are arranged centrally and projected from the lower surface of the power tool.

Such conventionally formed power tools are suitable and efficient for a great many applications.

However, there are certain areas of application for which these conventionally formed power tools have proven to be quite inadequate.

Such areas include for example overhead work, work near the ground, and work in narrowly spaced surroundings, and areas in which the danger exists that the operation hand while operating the power tool may be wounded or otherwise hurt, and areas where the electric cable or air hose for operating the power tool may be severed or otherwise damaged.

In short, there are a great many areas of application for which conventional power tools are totally unuseful or inefficient, and this mainly as the result of their general outer contour, and lack of safety precautions.

SUMMARY OF THE INVENTION

An object of the invention is to provide a hand power tool which is safe to operate, which can be easily manipulated, and be applied to practically any area of application.

A power tool according to the invention comprises an elongated housing, driving means within the housing, tool means at the front end of the housing and adapted to be driven by the drive means, gripping means on the housing spaced from the front end thereof, and an elongated protecting guard spaced from and extending substantially parallel to the elongation of the housing, wherein the elongated protecting guard is secured at its front end to the housing forwardly of the gripping means and secured at its rear end to the rear end of the gripping means so as to protect the hand of the user while gripping the gripping means during operation of the power tool.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 3 illustrates the arrangement of FIG. 2 and a first mode of operation thereof;

FIG. 4 also illustrates the arrangement of FIG. 2, but showing a second mode of operation thereof;

FIG. 5 further illustrates the arrangement of FIG. 2, and showing a still further mode of operation thereof and FIG. 6 illustrates the power tool of FIG. 2 during carrying thereof or during operation near the ground.

DESCRIPTION OF THE PREFERRED EMBODIMENTS

Figure 1:
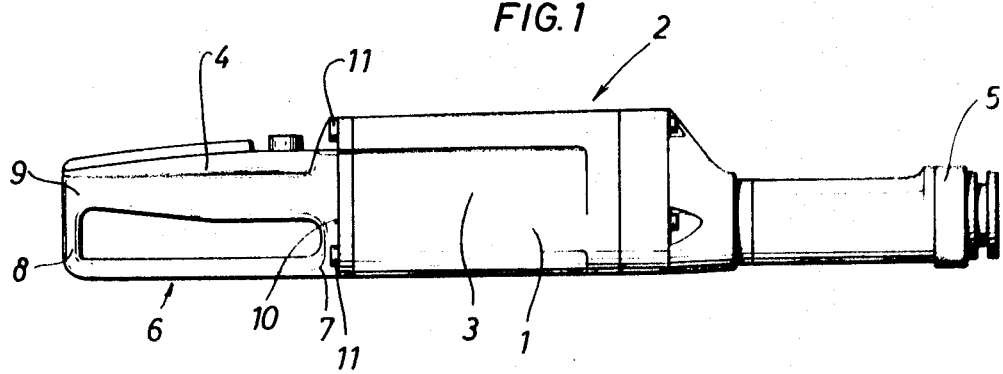
FIG. 1 shows a general plan view of a power tool provided with a hand-protector guard according to the invention.

As shown in FIG. 1, the hand power tool, in the form of grinder 1, comprises a substantially elongated housing 2 which at 3, centrally encloses a motor. The housing at its one end is arranged with a handgrip 4 while the other end thereof is provided with fixing means 5 for a grinder tool. A hand protector guard 6, in part, extends parallel and in spaced relationship with handgrip 4 and with its front end 7 is connected thereto frontwards of the handgrip. With its other end 8 and at a right angle, the protector guard is connected to the rear end 9 of the handgrip. The hand-protector guard, as for example clearly shown in FIG. 5, has a suitable width so that during operation of the power tool, the operator's hand holding the tool is sufficiently protected.

To improve the shock resistance of the protector guard and further in view of production purposes, it is preferable that the protector guard is integrally formed with the handgrip 4 and that it constitutes a separate section therewith, in which case, and as shown in FIG. 1, the forward end 7 of the protector guard is integrally connected with a frontward section 10 of the handgrip, in a vertical plane therewith. In this manner, the handgrip 4 and the protector guard 6 form a longitudinal, rearward extension of the housing, and which extension in the vertical plane may be connected to the housing by means of, for example, screws 11.

Figure 2:
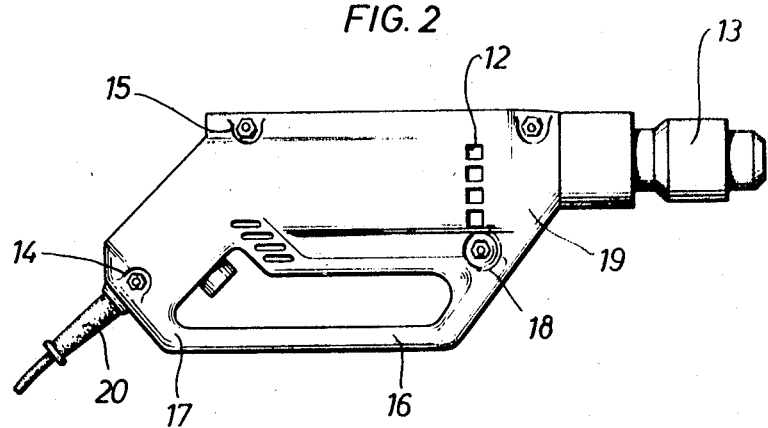
FIG. 2 shows a different type power tool provided with a further embodiment of a hand-protector guard according to the invention.

In a further embodiment, shown in FIG. 2, the power tool is in the form of hand drill 12, provided with a chuck 13 and a pistol-shaped handgrip 14, which projects downwardly from the rear end 15 and at an acute angle relative thereto. As shown, the hand protector guard 16 again connects the housing and the handgrip 14, and is thereby with its rear end 17 connected to the rear end of the handgrip while its front end 18 is connected to the housing 19, frontwards of the handgrip 14. In this arrangement, the front end 18 extends substantially parallel to the handgrip 14. In this embodiment, the hand protector 16, the handgrip 14 and the housing 19 preferably are formed into two sections or shells which are superimposed on one another in a plane which is parallel to or coaxial with the chuck axis. Such sections have been shown in FIG. 2. A conventional electric cord for the supply of power to the drill, is received in the housing in the rear end of handgrip 14. Through a suitable embodiment and arrangement of protector guard 16, not only the hand is protected but also this power cord which normally, and especially with conventionally formed power tools, is subject to substantial damage.

FIG. 3 shows the hand drill arrangement of FIG. 2, and illustrates a first mode of operating the tool in which the latter is being held in one hand so that the fingers are protected by the protector guard.

FIG. 4 also shows the hand drill arrangement of FIG. 2, and illustrates a second mode of operating the tool in which mode the tool is being held with two hands so that substantial parts of both hands are protected by the protector guard.

As illustrated, the hand protector guard is formed in such a way that together with the suitably shaped housing and handgrip of the drill, a substantially slim and elongated embodiment of a power tool is achieved, which is especially useful for application in narrow-spaced surroundings.

Also, as shown the electric cord is substantially protected by the protector guard against severance, and the like.

FIG. 5 illustrates a further mode of operating the hand drill of FIG. 2. In this instance, the drill is being used for an overhead application, and as clearly shown in this illustration, the fingers of the hand of the operator are well protected by the protector guard.

The illustration of FIG. 6 shows the manner in which the hand drill of FIG. 2 can be used for near-the-ground applications, in which again the fingers are well protected.

Also, FIG. 6 serves to illustrate the manner in which the hand drill may be carried along.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

1. A power tool comprising, in combination, an elongated housing; motor means arranged in its entirety in said housing; tool means at the front end of said housing adapted to be driven by said motor means; gripping means on said housing spaced from said front end thereof; and an elongated protecting guard spaced from and extending substantially parallel to the elongation of said housing, said elongated protecting guard being secured at its front end to said housing and at its rear end to the rear end of said gripping means so as to protect the hand of the user while gripping said gripping means especially during operation of said power tool within narrowly spaced surroundings.

2. A power tool according to claim 1, wherein said gripping means consists of a gripping handle arranged substantially at the rear end of said housing.

3. A power tool according to claim 2, wherein said gripping handle projects from said elongated housing at an acute angle relative thereto, and wherein said protecting guard includes a front end portion extending substantially parallel with said gripping handle.

4. A power tool according to claim 1, wherein said rear end of said elongated protecting guard is connected at a right angle to the rear end of said gripping means.

5. A power tool according to claim 4, wherein said elongated protecting guard is integrally formed with said gripping means.

6. A power tool as defined in claim 5, wherein said housing has a longitudinal axis and a rear face extending substantially normal to said axis, and wherein said protecting guard and said gripping means integral therewith have a common front face abutting against and connected to said rear face of said housing.

7. A power tool according to claim 1, wherein said protecting guard, said gripping means and said housing consist of two sections secured to each other in a plane in the longitudinal axis of said elongated housing.

8. A power tool according to claim 7 wherein said sections are secured to each other in a plane which includes the axis of said tool means.

9. A power tool according to claim 7, wherein said sections are secured to each other in a plane substantially coaxially with said axis of said tool means.

10. A power tool as defined in claim 1, wherein said projecting guard extends over a major portion thereof along one side and transversely spaced from said housing.